United States Patent Office 3,442,957
Patented May 6, 1969

---

3,442,957
PROCESS FOR PREPARING DIHYDROXY COMPOUNDS
Christoph Dörfelt, Burghausen (Salzach), Germany, assignor to Farbwerke Hoechst Aktiengesellschaft vormals Meister Lucius & Bruning, Frankfurt am Main, Germany, a corporation of Germany
No Drawing. Filed Jan. 11, 1966, Ser. No. 519,950
Claims priority, application Germany, Jan. 15, 1965,
F 44,966
Int. Cl. C07c 43/10, 43/04
U.S. Cl. 260—615                              3 Claims

---

ABSTRACT OF THE DISCLOSURE

Process for preparing 1.4-butylene glycol and polybutylene glycols by heating the corresponding diacetyl compounds in water at a temperature from 90° to 120° C. in the presence of 0.1 to 4 percent of an acidic substance.

---

It is known from the literature to prepare 4.4′-dihydroxydibutylether (1.4-dibutylene glycol) by trans-esterifying 4.4′ - diacetohydroxydibutyl ether (1.4 - dibutylene glycoldiacetate) with methanol by a generally applicable method (cf. Alexander and Schniep, J. Am. Chem. Soc. 70, 1839 and U.S. patent specification No. 2,499,725). This process entails the disadvantage that per mol of dibutylene glycoldiacetate 2 mols of methanol are required and that as by-products equivalent amounts of methyl acetate are obtained which in most cases are of no use.

Now we have found that these drawbacks can be avoided by saponifying the dibutylene glycoldiacetate with water in the presence of acid catalysts, which may be inorganic acids such as sulfuric acid or phosphoric acid, acid salts for example potassium bisulfate or organic sulfonic acids, for example p-toluene sulfonic acid. The practicability of this process could not be foreseen, since it is known that the dibutylene glycol and the dibutylene glycoldiacetate are easily converted into tetrahydrofurane during the heating in an acid medium. We have found, however, that this undesirable reaction does not take place when using only a small quantity of catalysts and operating at low temperatures. In general 0.1 to 4%, preferably 0.5 to 1% of catalysts calculated on the dibutylene glycoldiacetate are used and the temperature is maintained within a range of 90° to 120°. It is most effective to work at a temperature of approximately 100° C. which is maintained at this value for example by assuring a constant water excess in the reaction vessel. A mixture of dibutylene glycoldiacetate and water, for example, is heated to the boil in a mixer, the acetic acid formed upon the saponification is removed together with water by distillation and replaced by continuous addition of fresh water. The saponification is accelerated when steam is introduced into the dibutylene glycoldiacetate and the aqueous acetic acid formed in simultaneously distilled off.

The present process may also be applied in the saponification of 1.4-butylene glycoldiacetate, 1.4-tributylene glycoldiacetate and 1.4-tetrabutylene glycoldiacetate. It is particularly appropriate for the saponification of mixtures of 1.4-butylene glycoldiocetate and 1.4-polybutylene glycoldiacetates, which are prepared for example in accordance with U.S. patent specification No. 2,499,725 by reaction of tetrahydrofurane with acetic acid anhydride and which are characterised by the general formula

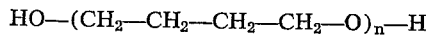

in which $n$ is a number from 1 to 10. During this process there are obtained as reaction products dihydroxy compounds of the general formula $$HO-(CH_2-CH_2-CH_2-CH_2-O)_n-H$$

in which $n$ has the meaning defined above. When preparing these products it is necessary to carry out the saponification in accordance with the present invention with the aid of a small quantity of catalysts and at a low temperature in order to avoid the formation of tetrahydrofurane.

The dihydroxy compounds obtained according to the process of the present invention, particularly the 1.4-dibutylene glycol, are important intermediary products from which there are obtained—if desired while adding other polyhydroxy compounds—by reaction with polycarboxylic acids, polycarboxylic acid esters, epichlorhydrine or isocyanates, valuable products of high molecular weight which are used as plastics.

The following examples serve to illustrate the invention but they are not intended to limit it thereto.

Example 1

In a glass flask 246 g. of dibutylene glycoldiacetate are heated to the boil while stirring with a solution of 3 g. of p-toluene sulfonic acid in 50 ml. of water. Into this mixture 50–100 ml. of water are dropped hourly at an inside temperature of 100° C. and simultaneously about the same quantity of liquid is distilled over a declining cooler. The distillate consists of aqueous acetic acid. The proceeding saponification is checked by a chromatographical analysis of samples which are taken from the reactor vessel every two hours. The following table lists the result:

| Time (hours) | 1.4-dibutylene-glycol, percent | 1.4-dibutylene glycolmono-acetate, percent | 1.4-dibutylene glycoldi-acetate, percent |
|---|---|---|---|
| 2 | 11.6 | 46.1 | 42.3 |
| 4 | 17.0 | 49.7 | 33.3 |
| 6 | 38.3 | 47.7 | 14.0 |
| 8 | 54.0 | 39.1 | 6.9 |
| 10 | 63.6 | 32.5 | 3.9 |
| 12 | 72.0 | 25.7 | 2.3 |
| 14 | 78.8 | 20.0 | 1.0 |
| 16 | 83.6 | 16.0 | 0.4 |
| 18 | 85.8 | 13.8 | 0.0 |

It is possible to continue the saponification in the manner described above, it is advantageous, however, to complete this process by heating with a small quantity of sodium hydroxide solution equivalent to the remaining acetyl groups, because the reaction slows down to a considerable extent at the end. The 1.4-dibutylene glycol is subsequently isolated by distillation of the residue in the flask. 154 g. of the product are obtained having a boiling point of 143–148°/5 mm., which represents 95.1% of the theory.

Example 2

In a glass flask 300 g. (=1.22 mols) of dibutylene glycoldiacetate are mixed by stirring with 1.5 g. of concentrated sulfuric acid, steam is introduced and the external temperature of the reaction mixture is maintained at 100° C. Water and acetic acid vapors are condensed in declining cooler and the acetic acid in the condensate is determined by titration. After 19 hours 2.4 mols of acetic acid have passed over, which is 98.4% of the theory. The residue in the flask is adjusted to a weakly alkaline range by means of sodium hydroxide solution and distilled off. After first runnings of 40 g. of water 185 g. of 1.4-dibutylene glycol pass over, which is 93.6% of the theory.

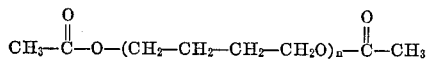

Comparative Example a

In a glass flask provided with a declining cooler a mixture of 100 g. of 1.4-dibutylene glycol and 0.5 g. of concentrated sulfuric acid is slowly heated while stirring. At an inside temperature of 120° C. tetrahydrofurane forms which is condensed in the cooler and distilled over. The distillation accelerates with increasing temperatures and is terminated within 3 hours at an inside temperature of 150° C. Apart from a small quantity of water the distillate contains 85 g. of tetrahydrofurane, which is 95.6% of the theory.

The example shows that the 1.4-dibutylene glycol decomposes almost quantitatively with tetrahydrofurane formation even in the presence of 0.5% of concentrated sulfuric acid, when heating to temperatures superior to 120° C. If the amount of sulfuric acid is increased to 10 g., the decomposition develops considerably quicker and is complete already after one hour.

In the same manner there decompose with formation of tetrahydrofurane 1.4-butylene glycol, 1.4-tri- and -tetra- butylene glycol and higher molecular 1.4-polybutylene glycols, when heated with acid substances to elevated temperatures.

Comparative Example b

In a glass flask 100 g. of 1.4-dibutylene glycoldiacetate are mixed by stirring with 2 g. of concentrated sulfuric acid and the mixture is gradually heated. The decomposition starts at 125° C. with formation of tetrahydrofurane which is condensed in a declining cooler and distilled off. After two hours and 30 minutes 40 g. of tetrahydrofurane have passed over together with other decomposition products.

In the same manner there are decomposed by means of acid catalysts at temperatures superior to 120° C. 1.4- butylene-glycoldiacetate and 1.4-polybutylene glycoldiacetates. The decomposition of these products, too, is accelerated when the amount of acid catalysts or the temperature is increased.

Example 3

For saponification purposes with steam according to the industrial scale there are used 300 kg. of a diacetate mixture which is obtained by reaction of acetic acid anhydride with tetrahydrofurane in the presence of bleaching earth. According to the chromatographical analysis the starting material contains 13.4% of 1.4-butylene glycoldiacetate, 73.7% of 1.4-dibutylene glycoldiacetate and 12.9% of high molecular polybutylene glycoldiacetates. The diacetate mixture is mixed with 1.5 kg. of concentrated sulfuric acid in a tank of a capacity of 600 litres and steam is passed through at an inside temperature of 100° C. The dilute acetic acid formed is distilled over a declining cooler. After 24 hours 95% of the acetyl group have split off. In order to complete the reaction and the neutralisation of the sulfuric acid 35 kg. of sodium hydroxide solution of 20% are added and stirring is continued for 2 hours at 100° C. The reaction product is then fractionated in a glass distillation column. 17.2 kg. of 1.4-butylene glycol (82.7% of the theory) and 132 kg. of 1.4-dibutylene glycol (90.6% of the theory) are obtained. A residue of 35 kg. is left which contains high molecular polybutylene glycols, sodium acetate and sodium sulfate. From these products tributylene glycol of the formula HO—(CH$_2$—CH$_2$—CH$_2$—CH$_2$—O)$_3$H can be isolated which boils at 182–184°/1.5 mm.

I claim:
1. A process for preparing dihydroxy compounds of the formula

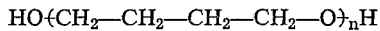

in which $n$ represents a number of 1 to 10, which comprises heating diacetyl compounds of the formula

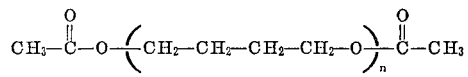

in which $n$ has the meaning given above, with water in the presence of 0.1 to 4 percent, calculated on the weight of the diacetyl compound, of an acidic catalyst to a temperature of 90° to 120° C., wherein the acidic catalyst is selected from the group consisting of sulfuric acid, phosphoric acid, potassium hydrogen sulfate and p-toluene sulfonic acid.

2. The process as claimed in claim 1, wherein the acidic catalyst is used in an amount between 0.5 and 1.0 percent, calculated on the weight of the diacetyl compound.

3. The process as claimed in claim 1, wherein the reaction mixture is heated to a temperature of about 100° C.

References Cited

UNITED STATES PATENTS 1,454,604   5/1923   Rodebush _____ 260—635

OTHER REFERENCES

Thorpe, Dictionary of Applied Chem., vol. 3, Longmans Green & Co., 1922 pp. 561–564 TP9T7.

Cram et al., Org. Chem., McGraw-Hill, New York, 1964, QD251C7, 1964 p. 355.

Groggins, unit processes in Org. Synth., McGraw-Hill, New York, 1952 pp. 654–655.

Ingold et al., J. Chem. Soc., 1932, pp. 759–760 QD1C6.

Cloke et al., J. Am. Chem. Soc., vol. 65, p. 986, 1943 QD1A5.

Hickinbottom, Reactions of Org. Compounds, Longmans Green & Co., New York, 1957 pp. 355–358 QD251H6 1957.

LEON ZITVER, *Primary Examiner.*

HOWARD T. MARS, *Assistant Examiner.*

U.S. Cl. X.R.

260—635